US012242229B2

(12) United States Patent
Favre et al.

(10) Patent No.: US 12,242,229 B2
(45) Date of Patent: Mar. 4, 2025

(54) MUSICAL OR STRIKING MECHANISM COMPRISING AN ELECTRIC GENERATOR SYSTEM

(71) Applicant: The Swatch Group Research and Development Ltd, Marin (CH)

(72) Inventors: Jérôme Favre, Neuchatel (CH); Jean-Jacques Born, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 918 days.

(21) Appl. No.: 17/077,036

(22) Filed: Oct. 22, 2020

(65) Prior Publication Data

US 2021/0191337 A1 Jun. 24, 2021

(30) Foreign Application Priority Data

Dec. 20, 2019 (EP) .................................... 19218490

(51) Int. Cl.
*G04C 21/06* (2006.01)
*G04B 21/06* (2006.01)
*G10K 1/076* (2006.01)

(52) U.S. Cl.
CPC ............. *G04C 21/06* (2013.01); *G04B 21/06* (2013.01); *G10K 1/076* (2013.01)

(58) Field of Classification Search
CPC ............ G04B 21/06; G04C 21/06; G10F 1/06
See application file for complete search history.

(56) References Cited

U.S. PATENT DOCUMENTS 4,890,528 A * 1/1990 Kamijima ................. G10F 1/06 84/95.2
5,521,321 A * 5/1996 Liu ........................... G10F 1/06 84/95.2

(Continued)

FOREIGN PATENT DOCUMENTS

CH 310 524 A 10/1955
CH 696 507 A5 7/2007

(Continued)

OTHER PUBLICATIONS

European Search Report for EP 19 21 8490 dated Jun. 22, 2020.

(Continued)

*Primary Examiner* — Edwin A. Leon
*Assistant Examiner* — Jason M Collins
(74) *Attorney, Agent, or Firm* — Sughrue Mion, PLLC

(57) ABSTRACT

A musical or striking mechanism (1) for a timepiece or musical box, includes an energy source (6) delivering a mechanical torque and device for transmitting mechanical torque from the energy source to a wheel set for generating music or a striking wheel set (4). The mechanism also includes a wheel set governor (2) configured to regulate, around a reference speed value, the pivoting speed of the wheel set about a pivot axis, and including a break for braking the wheel set configured to return the pivoting speed thereof to the reference speed. The wheel set governor includes a system having an electric generator (16) whereof a rotor is mechanically connected to the energy source delivering the mechanical torque, and an electronic circuit for regulating the rotation speed of the generator.

16 Claims, 2 Drawing Sheets

(56) References Cited

U.S. PATENT DOCUMENTS

| | | | | |
|---|---|---|---|---|
| 8,588,034 | B2 * | 11/2013 | Pittet | G04B 23/00 368/243 |
| 8,963,730 | B1 * | 2/2015 | Dickerman | G04G 15/006 340/636.1 |
| 2002/0183865 | A1 | 12/2002 | Ichikawa et al. | |
| 2005/0073913 | A1 * | 4/2005 | Born | G04C 10/00 368/127 |
| 2007/0079657 | A1 * | 4/2007 | Moteki | G04B 21/06 73/535 |
| 2016/0327909 | A1 * | 11/2016 | Henein | G04B 23/005 |
| 2017/0212475 | A1 * | 7/2017 | Niwa | G04B 37/0075 |

FOREIGN PATENT DOCUMENTS

| | | | |
|---|---|---|---|
| EP | 1243986 | A1 | 9/2002 |
| EP | 2 487 547 | A1 | 8/2012 |
| JP | 2000214844 | A | 8/2000 |
| WO | 01/98843 | A1 | 12/2001 |

OTHER PUBLICATIONS

Search Report dated Mar. 9, 2021, From the European Patent Office in EP 20202859.

Communication dated Oct. 26, 2021, issued by the Japanese Patent Office in application No. 2020-176484.

* cited by examiner

MUSICAL OR STRIKING MECHANISM COMPRISING AN ELECTRIC GENERATOR SYSTEM

CROSS-REFERENCE TO RELATED APPLICATIONS

This application claims priority to European Patent Application No. 19218490.1 filed Dec. 20, 2019, the entire contents of which are incorporated herein by reference.

TECHNICAL FIELD

The invention relates to a musical or striking mechanism for a timepiece or musical box comprising an energy source delivering a mechanical torque and means for transmitting mechanical torque from said energy source to a wheel set for generating music or a striking wheel set. The invention also relates to a timepiece or musical box comprising such a musical or striking mechanism, as well as a use of a particular musical or striking wheel set governor or regulator in such a mechanism. More particularly, it relates to the field of horology, and more particularly that of timepieces comprising a striking mechanism or a musical mechanism, such as striking mechanical watches, musical boxes or similar.

TECHNOLOGICAL BACKGROUND

Striking mechanical watches generally dispose of a striking mechanism governor or regulator whereof the role is to neutralise the effect of significant torque variations during the winding of devices for creating sound in order to regulate the tempo, and if possible the intensity, of the striking mechanism. Indeed, in repeater watches or in those that strike when passing the hour, the striking hammers must be wound before the strike on the gongs, which must be as loud as possible in order to maximise the acoustic level. The winding torque is optimised according to what the striking barrel may provide. Yet, such a striking barrel may not provide constant torque. The variation of the tempo and of the intensity of the strike being closely linked to the unwinding curve of the barrel spring, in many cases, the striking mechanism or the music slows down and decreases in amplitude at the end of the function, which is unpleasant for the user. This is why a striking mechanism governor is used at the same time as the winding of hammers, which makes it possible to stabilise the unwinding speed of the barrel and thus obtain a strike of constant amplitude and tempo. Such a governor often consists of an inertia in rotation whereof the dissipation of the energy is generally carried out either by inertia variation, or by friction, or by Eddy currents, or by a combination of various methods. Such a striking mechanism governor is for example described in patent application EP 2 487 547 A1. Pallet systems also exist in order to carry out such a striking mechanism governor function.

The same principle is applied in musical watches, where the striking of the gongs by hammers is replaced with the blades of a pin-barrel that is wound using pins in movement. In the musical boxes, said governor often takes the form of fly-vanes rotating in the air at high speed, in order to minimise the noise nuisances.

Although such systems for regulating wheel sets for generating music or striking wheel sets fulfil relatively well the regulation function, all of the energy dissipated in the governor is however lost. Furthermore, such regulation systems are fairly noisy in general and may be bulky.

Therefore, there is a need to be able to dispose of a musical or striking mechanism for a timepiece or musical box, making it possible to recover all or part of the energy dissipated in the governor in order to dispose of a rechargeable energy source in the timepiece or in the musical box, whilst providing an optimum and discreet regulation of the wheel set for generating music or the striking wheel set.

SUMMARY OF THE INVENTION

To this end, the invention relates to a musical or striking mechanism for a timepiece or musical box, and that comprises the features mentioned in the independent claim 1.

Particular forms of the musical or striking mechanism are defined in the dependent claims 2 to 11.

Thanks to the presence of a wheel set governor comprising an electric generator, whereof a rotor is mechanically connected to the energy source delivering the mechanical torque, and an electronic circuit for regulating the rotation speed of the generator, the energy dissipated in the governor is advantageously recovered in the form of electrical energy. Indeed, the alternating voltage provided by the electric generator makes it possible to obtain a rechargeable electrical energy source within the mechanism. The electrical energy provided by such an electrical energy source may subsequently, for example, make it possible to charge an electric accumulator or a condenser, in order to be advantageously reused by an electrical component, such as a light-emitting diode to illuminate elements of the timepiece, such as gongs, hammers or hands for example. The electrical energy may also, alternatively, be reused by a component for generating sound or vibrations within the mechanism. Furthermore, such a governor provides a regulation of the mechanical torque delivered by the energy source by braking by the generator, which is itself electrically braked by the electronic circuit, which offers a regulation of the wheel set that is both precise and silent.

According to a particular technical feature of the invention, the means for braking the wheel set are braking means configured to electrically brake the rotation of the rotor of the electric generator.

According to another particular technical feature of the invention, the electronic circuit is an oscillator electronic circuit that comprises an integrated servo-control circuit with complementary metal oxide semiconductor (CMOS) technology.

Advantageously, the stator of the generator consists of an assembly of coils connected in series, and the integrated servo-control circuit comprises a transistor, said transistor being connected to the stator of the electric generator and being configured, via a control by the integrated circuit, to short-circuit the assembly of coils for a fraction of the period of the alternating voltage provided by the generator, said transistor constituting said electric braking means. Such a configuration provides a simple and economical means for electrically braking the generator and thus making it possible to regulate the wheel set for generating music or the striking wheel set.

To this end, the invention also relates to a timepiece or musical box comprising the musical or striking mechanism described above, and that comprises the features mentioned in the independent claim 12.

Particular forms of the timepiece or musical box are defined in the dependent claims 13 and 14.

To this end, the invention also relates to a use as a music generation or striking wheel set governor or regulator, in the musical or striking mechanism described above, of a system comprising an electric generator whereof a rotor is mechanically connected to the energy source delivering the mechanical torque, and an electronic circuit for regulating the rotation speed of the generator, and that comprises the features mentioned in the independent claim 15.

BRIEF DESCRIPTION OF THE FIGURES

The aims, advantages and features of the musical or striking mechanism for a timepiece or musical box according to the invention will become clear in the following description based on at least one non-limiting embodiment illustrated by the drawings wherein.

DETAILED DESCRIPTION OF THE INVENTION

The invention relates to the field of horology, and more particularly that of musical boxes or timepieces comprising a musical or striking mechanism. The invention will more specifically be described for the preferred application of a timepiece comprising a striking mechanism. Nevertheless, the invention is applicable to the regulation of any wheel set for generating music or striking wheel set. In this regard, it will be designated in the remainder of the disclosure under the generic term “timepiece” a timepiece or a musical box, and under the term “striking mechanism” a musical or striking mechanism.

Figure 1:
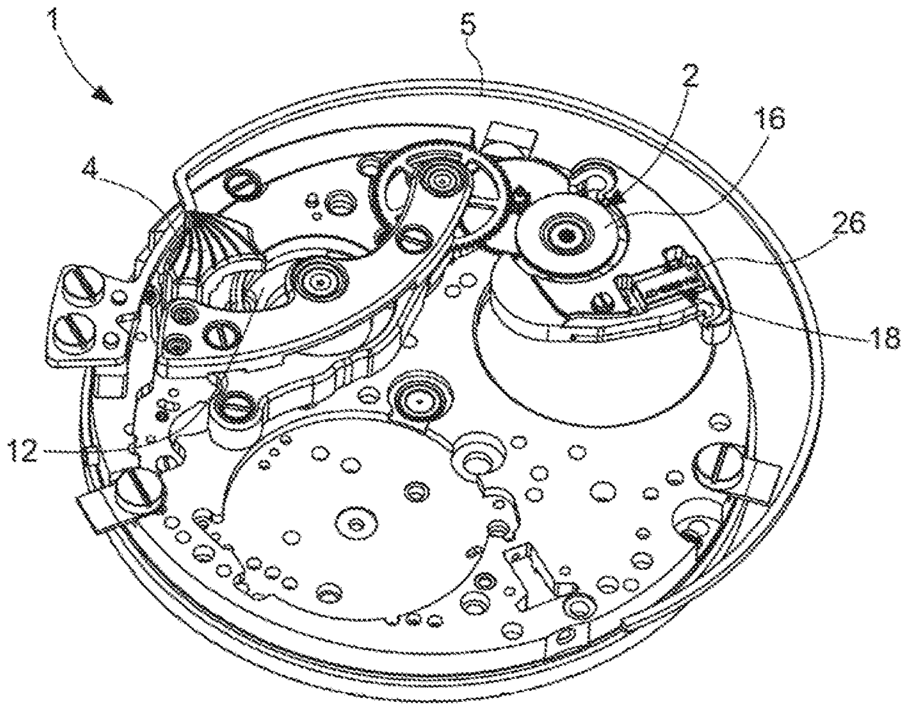
FIG. 1 is a perspective view of a striking mechanism of a watch according to one embodiment of the invention, comprising a striking wheel set governor.
Figure 2:
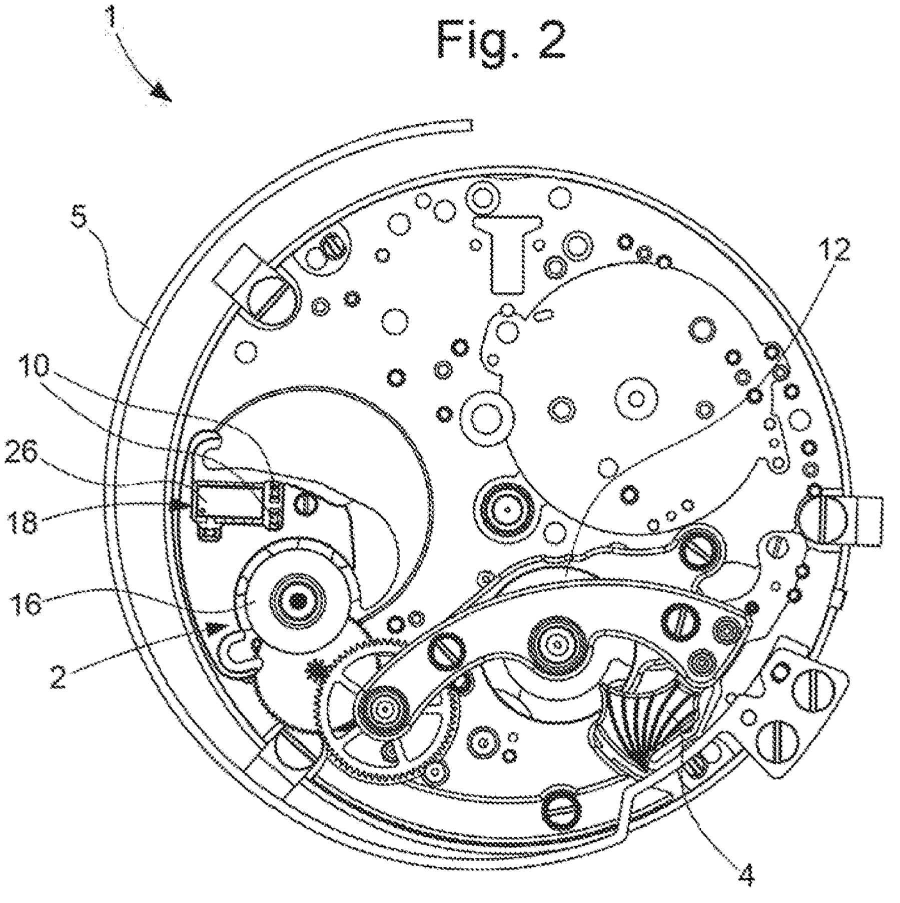
FIG. 2 is a top view of the striking mechanism of FIG. 1.
Figure 3:
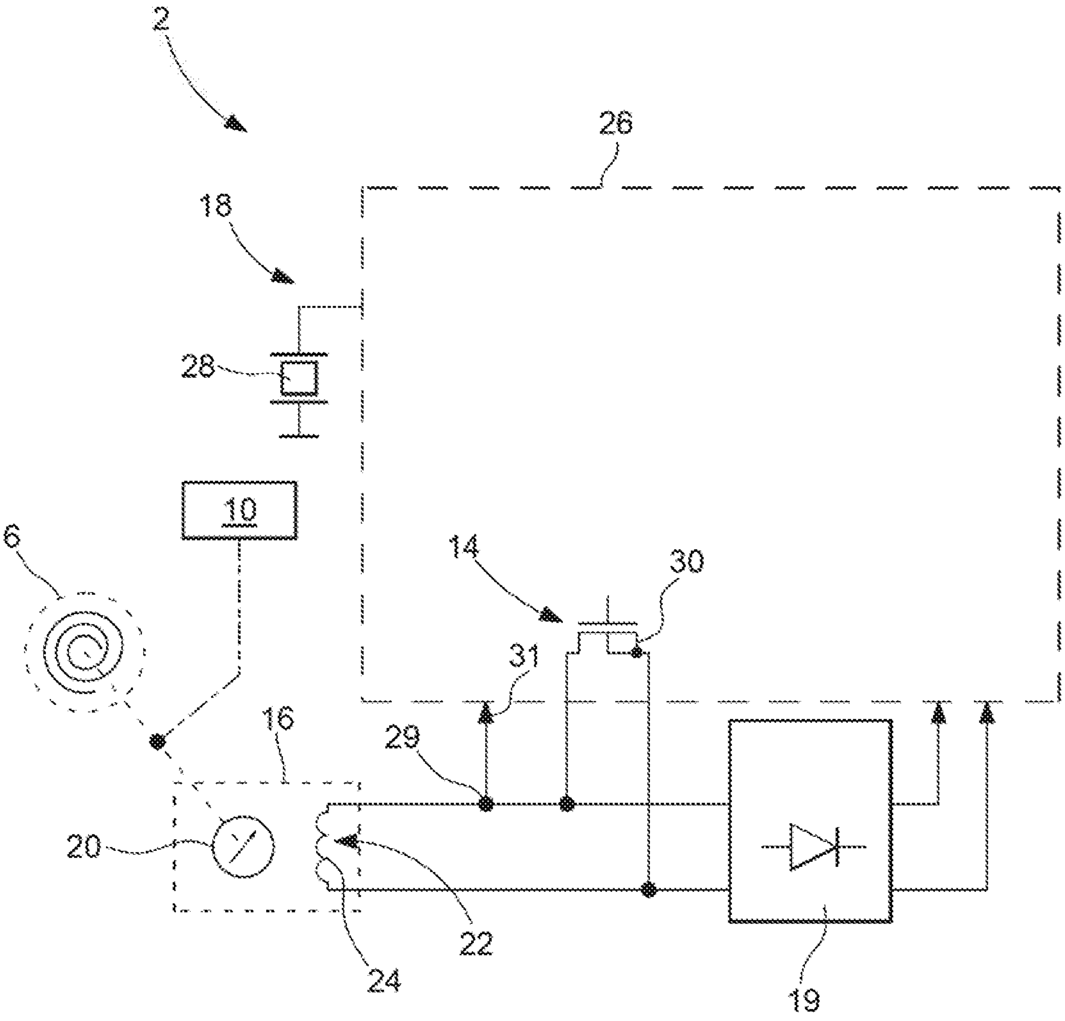
FIG. 3 is a schematic representation of the striking wheel set governor of FIG. 1.

In this description of a preferred use of the invention illustrated in FIGS. 1 to 3, the invention relates to a striking mechanism 1 comprising a striking wheel set 4 governor 2, for a timepiece (not shown in the figures for reasons of clarity). The timepiece is typically a striking mechanical watch, such as for example a repeater watch. In this preferred use of the invention illustrated in FIGS. 1 to 3, the striking wheel set 4 is a percussion hammer that is configured to come to strike on a gong 5 of the striking mechanism 1. Alternatively not shown, the wheel set may be one or more lever(s), or also one or more pin(s) in movement that come to strike on the blades of a pin-barrel in the case of a musical watch. Alternatively also, the gong 5 may be replaced with one or more resonator(s), gong(s), or bell(s), or also with a resonance box in the case of a musical box.

As seen in FIG. 3, the striking mechanism 1 comprises, apart from the governor 2, an energy source 6 delivering a mechanical torque, and means for transmitting mechanical torque from the energy source 6 to the striking wheel set 4 (said latter not being shown in the figures for reasons of clarity). Preferably, the striking mechanism 1 also comprises at least one electrical component 10 connected to the governor 2. In the particular embodiment illustrated in FIGS. 1 and 2, the mechanism 1 comprises three electrical energy storage components 10, namely ceramic condensers. The energy stored in said condensers may for example be reused by luminous components within the timepiece in order to carry out a synchronised illumination. Alternatively or additionally, the electrical component(s) 10 may be an accumulator, and/or a luminous component, such as a light-emitting diode, and/or an electrical component for generating sound or vibrations within the mechanism 1. When the electrical component 10 is an electrical component for generating sound, said latter is for example a loudspeaker associated with an amplifier.

In the particular embodiment illustrated in FIGS. 1 to 3, the energy source 6 is a striking barrel received in a location 12 of the mechanism 1 (the striking barrel 6 not being shown in FIGS. 1 and 2 for reasons of clarity). The striking barrel 6 is typically a spring barrel, which may be wound in a single movement by a user of the timepiece. Such a spring barrel delivers in general a mechanical torque that varies according to the unwinding of the spring. Alternatively not shown, the energy source 6 may be a barrel of the mechanical horological movement of the timepiece, whereof a portion of the energy accumulated is recovered for the musical or striking mechanism 1.

The wheel set 4 governor 2 or regulator is intended to regulate the tempo of the striking, or of the melody according to the case, of the mechanism 1. In the particular embodiment illustrated in FIGS. 1 to 3, the wheel set 4 governor 2 is intended to regulate the tempo of the striking of the striking mechanism 1. More specifically, the governor 2 is configured to regulate, around a reference speed value, the pivoting speed of the wheel set 4 about a pivot axis. For this, the governor 2 comprises means 14 for braking the wheel set 4 (that will be described subsequently) configured to return the pivoting speed of the wheel set 4 to the reference speed.

As seen in FIG. 3, the governor 2 consists of a system comprising an electric generator 16 and an electronic circuit 18 for regulating the rotation speed of the generator 16. The generator 16 is for example connected to the electronic circuit 18 via a rectifier circuit 19.

As illustrated in FIG. 3, the electric generator 16 comprises a rotor 20 and a stator 22. The rotor 20 is connected to the energy source 6 delivering the mechanical torque, via a kinematic chain not seen in the figures (gear train). The stator 22 for example consists of an assembly of coils 24 connected in series (a single coil 24 being shown in FIG. 3 for reasons of clarity). The coils 24 are advantageously non-iron coils, which makes it possible to prevent any start positioning torque. Preferably, the electric generator 16 is an electro-dynamic microgenerator. When the mechanism 1 comprises one or more electrical component(s) 10, said latter may be directly or indirectly connected to the electric generator. When one of the components 10 at least is an electrical energy storage component, the electrical energy accumulated in said component may in particular be used to supply the electronic circuit 18 when the energy source 6 does not deliver mechanical torque.

Preferably, the electronic circuit 18 is an oscillator circuit. In the particular embodiment illustrated in FIGS. 1 to 3, the electronic circuit 18 comprises an integrated servo-control circuit 26 with complementary metal oxide semiconductor (CMOS) technology. According to this particular embodiment, and as illustrated in FIG. 3, the electronic circuit 18 also comprises a time base, such as a quartz 28 or a MEMS resonator or an RLC oscillating circuit, which is connected to the integrated circuit 26 and which provides a reference frequency. Alternatively not shown, the electronic circuit 18 comprises a capacitance inductance resistance circuit configured to provide a reference frequency.

The integrated circuit 26 has an input terminal 29 connected to the assembly of coils 24 of the generator 16 and making it possible to recover an analogue signal 31 coming from said latter. Without this being limiting within the scope of the present invention, the integrated circuit 26 comprises for example a chain of divisions (including an inhibition programming logic), an hysteresis comparator for logically forming the analogue signal 31, a reversible counter, as well as a decision logic (such elements not being shown in FIG. 3 for reasons of clarity). The integrated circuit also comprises a transistor 30, typically an insulated gate field effect and metal oxide semiconductor (MOS) transistor.

The hysteresis comparator is connected to the input terminal 29. The chain of divisions is connected between the quartz 28 and a positive input of the reversible counter. The other input of the reversible counter, which is a negative input, is connected to the output of the hysteresis comparator. The decision logic is connected as output of the reversible counter, and has an output for controlling the transistor 30.

The reversible counter carries out the difference between the two pulsed type signals coming from the quartz 28 on the one hand, and from the generator 16 on the other hand, as well as the integration of pulses over time. The reversible counter further indicates the advance or the delay of the angular position of the rotor 20 of the generator 16 in relation to the ideal angular position thereof (given by the quartz 28) and the decision logic that monitors the counter decides on the instruction to be established. Said decision logic in fact acts according to the value of the reversible counter (positive or negative) and controls the transistor 30.

The transistor 30 is connected to the stator 22 of the electric generator 16. More specifically, as illustrated in FIG. 3, the transistor 30 is connected in parallel at the same time as the coils 24 via the two drain and source electrodes thereof. The transistor 30 constitutes the braking means 14, which are braking means configured to electrically brake the rotation of the rotor 20 of the generator 16.

The electronic circuit 18 is thus configured to regulate, around a reference speed, the rotation speed of the generator 16, and to thus brake the wheel set 4 so as to regulate the pivoting speed thereof about the pivot axis. The reference speed is for example equal to 7 revolutions per second, without this being limiting within the scope of the present invention. Thus, regardless of the mechanical torque delivered by the energy source 6, the electric generator 16 rotates at a constant or near-constant speed. For this, the frequency of the signal coming from the generator 16 (which is proportional to the rotation speed of said latter) is compared to a sub-multiple of the reference frequency (provided by the quartz 28 in the embodiment in FIG. 3). If necessary, the generator 16 is then electrically braked by the braking means 14 that constitutes the transistor 30, so as to be controlled at the reference frequency provided by the quartz 28. For this, the transistor 30, which is controlled by the decision logic of the integrated circuit 26, short-circuits the assembly of coils 24 of the stator 22 for a fraction of the period of the alternating voltage provided by the generator 16. The transistor 30 then acts as a means for intermittent and pulsed braking of the rotor 20 of the generator 16.

During operation, when the rotor 20 of the generator 16 is moved when exposed to a torque provided by the spring of the barrel 6, an induced alternating voltage appears at the terminals of the assembly of coils 24 of the stator 22. The induced alternating voltage is then used for two functions: firstly said voltage is rectified via the rectifier circuit 19 and makes it possible to supply the integrated circuit 26, and secondly said voltage makes it possible to provide an electrical energy source available for the timepiece. Said rechargeable electrical energy source then makes it possible, for example, to supply the electrical component(s) 10. The electrical energy accumulated may subsequently be advantageously reused by an electrical component, such as a light-emitting diode in order to illuminate elements of the timepiece, such as gongs, hammers or hands for example, or also by a component for generating sound or vibrations within the mechanism.

The invention claimed is:

1. A musical or striking mechanism for a timepiece or musical box, comprising an energy source delivering a mechanical torque and means transmitting mechanical torque from said energy source to a wheel set generating music or a striking wheel set, the mechanism further comprising a wheel set governor, said governor being configured to regulate, around a reference speed value, the pivoting speed of the wheel set about a pivot axis, and comprising means for braking the wheel set configured to return the pivoting speed thereof to the reference speed, wherein the wheel set governor includes a system comprising an electric generator whereof a rotor is mechanically connected to the energy source delivering the mechanical torque, and an electronic circuit for regulating the rotation speed of the generator, and wherein the mechanism is further configured to recover electricity from braking the wheel set and supply that electricity to any of a light-emitting element and a loudspeaker.

2. The musical or striking mechanism according to claim 1, wherein the electronic circuit is provided with a time base providing a reference frequency.

3. The musical or striking mechanism according to claim 2, wherein the time base comprises a quartz or MEMS resonator or an RLC oscillating circuit.

4. The musical or striking mechanism according to claim 1, wherein the electronic circuit comprises a capacitance inductance resistance circuit configured to provide a reference frequency.

5. The musical or striking mechanism according to claim 1, wherein the means for braking the wheel set are braking means configured to electrically brake the rotation of the rotor of the electric generator.

6. The musical or striking mechanism according to claim 1, wherein the electronic circuit is an oscillator electronic circuit that comprises an integrated servo-control circuit with complementary metal oxide semiconductor technology.

7. The musical or striking mechanism according to claim 6 wherein the stator of the generator includes an assembly of coils connected in series, and in that the integrated servo-control circuit comprises a transistor, said transistor being connected to the stator of the electric generator and being configured, via a control by the integrated circuit, to short-circuit the assembly of coils for a fraction of the period of the alternating voltage provided by the generator, said transistor constituting said electric braking means.

8. The musical or striking mechanism according to claim 1, wherein the mechanism further comprises at least one electrical component connected to the electric generator.

9. The musical or striking mechanism according to claim 8, wherein the electrical component is chosen from the group consisting of an electrical energy storage component, such as an accumulator or a condenser, a luminous component, such as a light-emitting diode, and an electric component for generating sound or vibrations.

10. The musical or striking mechanism according to claim 8, wherein the electrical component is directly connected to the electric generator.

11. The musical or striking mechanism according to claim 1, wherein the energy source is a striking barrel.

12. A timepiece or musical box comprising a musical or striking mechanism (1), wherein the musical or striking mechanism is in accordance with claim 1.

13. A timepiece or musical box according to claim 12, wherein it further comprises a mechanical horological movement, and in that the energy source of the musical or striking mechanism is a barrel of said mechanical horological movement.

14. The timepiece or musical box according to claim 12, wherein the timepiece is a mechanical striking watch.

15. The musical or striking mechanism according to claim 1, wherein the mechanism further comprises a gong, and wherein the wheel set or striking wheel set comprises a percussion hammer configured to strike a gong of the mechanism.

16. Use as a music generation or striking wheel set governor, in a musical or striking mechanism for a timepiece or musical box comprising an energy source delivering a mechanical torque and means transmitting mechanical torque from said energy source to a wheel set generating music or a striking wheel set, of a system comprising an electric generator whereof a rotor is mechanically connected to the energy source delivering the mechanical torque, and an electronic circuit for regulating the rotation speed of the generator, said circuit being configured to regulate, around a reference speed value, the rotation speed of the generator, and thus to brake the wheel set so as to regulate the pivoting speed of the wheel set about a pivot axis, and wherein the mechanism is further configured to recover electricity from braking the wheel set and supply that electricity to any of a light-emitting element and a loudspeaker.

* * * * *